Aug. 27, 1963 E. L. GAMBER 3,102,157
CORNEAL CONTACT LENS HAVING STOP FLANGE ENGAGED BY EYELIDS
Filed Jan. 2, 1959 2 Sheets-Sheet 1

INVENTOR.
ELMER L. GAMBER
BY Barnes & Seed
ATTORNEYS

Aug. 27, 1963     E. L. GAMBER     3,102,157
CORNEAL CONTACT LENS HAVING STOP FLANGE ENGAGED BY EYELIDS
Filed Jan. 2, 1959     2 Sheets-Sheet 2
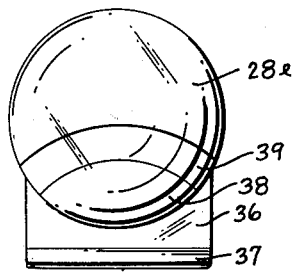
Fig. 5
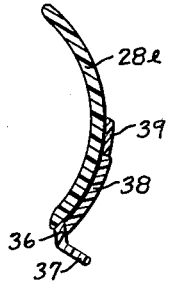
Fig. 6
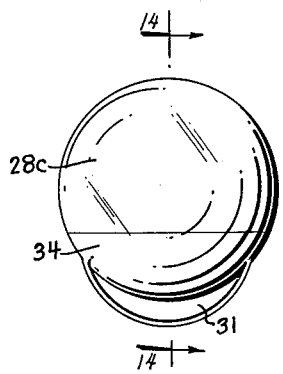
Fig. 13
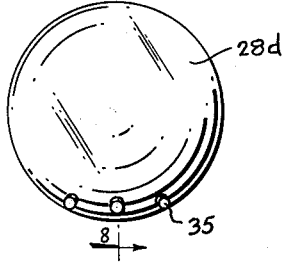
Fig. 7
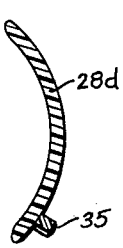
Fig. 8
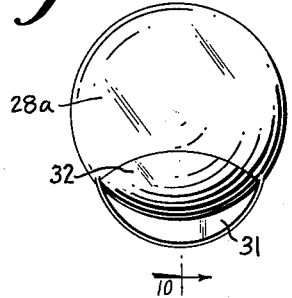
Fig. 9
Fig. 10
Fig. 14
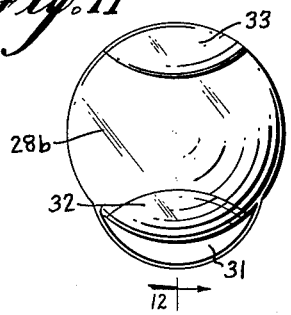
Fig. 11
Fig. 12
INVENTOR.
ELMER L. GAMBER
BY Barnes & Seed
ATTORNEYS

United States Patent Office 3,102,157
Patented Aug. 27, 1963

3,102,157
CORNEAL CONTACT LENS HAVING STOP
FLANGE ENGAGED BY EYELIDS
Elmer L. Gamber, 2339 N. 51st, Seattle, Wash.
Filed Jan. 2, 1959, Ser. No. 784,541
3 Claims. (Cl. 88—54.5)

This invention relates to improvements in corrective ophthalmic contact lenses of the corneal type, as for example, that disclosed in United States Patent No. 2,510,438, and namely, a lens having a margin smaller than the limbus of the eye but larger than the maximum opening of the iris. Such lenses are lubricated by the natural eye fluids rather than requiring the use of buffer solutions as in the case of the earlier lenses which extended beyond the border of the vision correcting area and have generally been referred to in the optometrical field as scleral lenses.

As pointed out in the aforesaid patent, when a corneal lens is in applied position on the eye, the upper eyelid, in blinking or closing over the eye, will tend to disturb the position of the lens on the cornea. Usually this disturbance tends to lift the lens relative to the cornea, and in fact, may cause it to shift up beyond the limbus portion partially onto the sclera. Subsequent blinking or closing of the eyelid has been relied upon to restore the lens to a centralized position with relation to the cornea. However, this end is not always realized, and, in fact, occasionally a corneal lens will work upwardly beneath the upper eyelid completely beyond the limbus portion.

Another problem of corneal lenses which has limited their use is the rotation of the lens on the cornea. This rotation is a normal occurrence, and has made the employment of prisms or decentred lenses impossible as for correction of abnormal visual axes of the eye or cases in which the external ocular muscles and accommodation are not in harmony.

Also, this lens rotation has made the placing of a fixed bifocal segment impractical. Before the present invention the only solution to the bifocal problem for a corneal lens has been by placing the near vision or reading portion on the outer rim of the lens and completely around the central distant vision portion. Thus, in theory the user should be able to gaze downwardly through the outer area of the lens which contains the added power required for near work regardless of how much the lens has rotated on the cornea. However, in actual practice difficulty is often experienced in seeing through this near vision area because of vertical shifting of the lens or variances in the position of the lens in one eye relative to that in the other eye.

With these problems in view the present invention aims to provide an improved lens of the general corneal type which is of simple and safe construction, will not rotate on the cornea, cannot shift upwardly completely beyond the upper eyelid, and which can be easily accurately positioned relative to the lower eyelid.

The invention further aims to provide an improved multifocal corneal lens which does not require the use of concentric areas of higher powers.

As still another object the present invention aims to provide an effective corneal lens which can incorporate prism corrections.

Other more particular objects and advantages will, together with these general objects, appear and be understood in the course of the following description and claims, the invention consisting in the novel construction and in the adaptation and combination of parts hereinafter described and claimed.

In the accompanying drawings:

FIG. 5 is a front elevational view of a trifocal lens embodying my invention and having a modified stop means.

FIG. 6 is a vertical sectional view taken on the line 6—6 of FIG. 5.

FIG. 7 is a front elevational view of a lens illustrating another form of stop means.

FIG. 8 is a vertical sectional view taken on the line 8—8 of FIG. 7.

FIG. 9 is a front elevational view of a bifocal lens embodying my invention.

FIG. 10 is a vertical sectional view taken on the line 10—10 of FIG. 9.

FIG. 11 is a front elevational view of a contact lens with dual bifocal areas for both up and down near vision and embodying my invention.

FIG. 12 is a vertical sectional view taken on the line 12—12 of FIG. 11.

FIG. 13 is a front elevational view of still further modified bifocal contact lens embodying the present invention, and FIG. 14 is a vertical sectional view taken on the line 14—14 of FIG. 13.

For a ready understanding of the present invention it should be kept in mind that when the human eye is blinked substantially all of the blinking movement is normally performed by the upper eyelid. I utilize this physical factor to insure maintenance of proper lens positioning by providing stop means adjacent the lower margin of the lens which projects from the convex face of the lens for engagement with the lower eyelid. Thus if the lens drifts upwardly while in use, blinking of the concerned eye causes the upper eyelid to engage the stop means and push it downwardly to the lower eyelid, thereby repositioning the lens.

Figure 1:
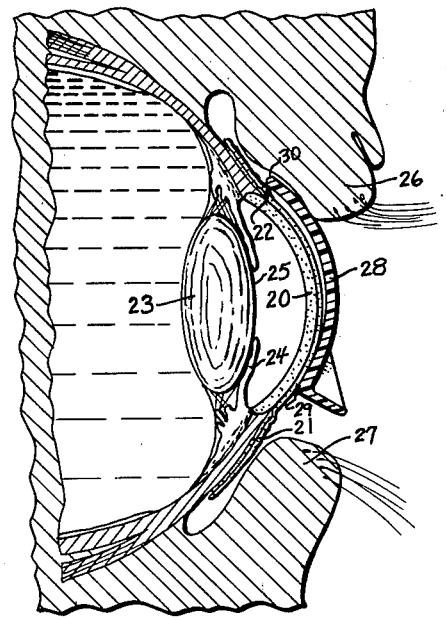
FIGURE 1 is a vertical section to an enlarged scale through the forward portion of a human eye illustrating a contact lens embodying the present invention in applied position thereon, but having shifted upwardly partially beyond the limbus.
Figure 3:
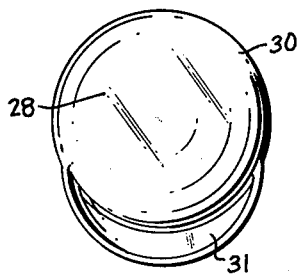
FIG. 3 is a front elevational view of the contact lens of FIG. 1.
Figure 2:
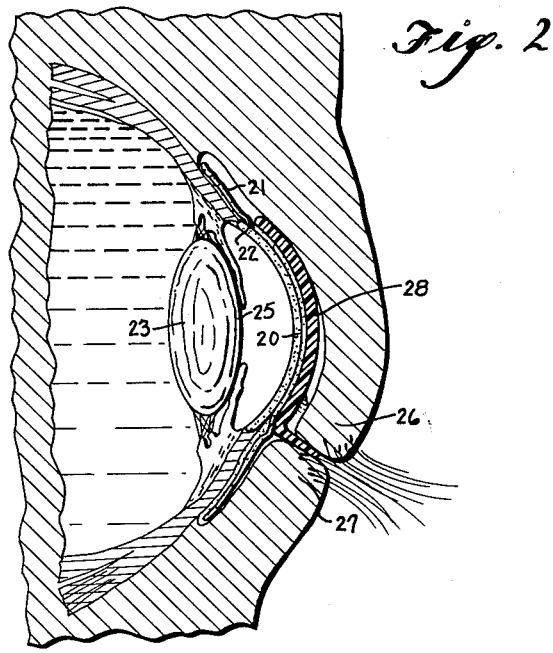
FIG. 2 is a vertical section taken as in FIG. 1 but with the eye in blinking position to reposition the lens.
Figure 4:
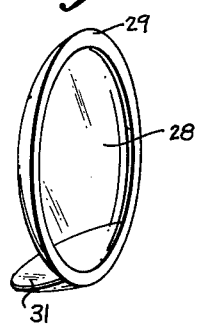
FIG. 4 is a perspective view of the contact lens of FIG. 1 as seen from the hind quarter.

Continuing to a more detailed explanation of the invention and referring to the drawings, it is seen that in FIGS. 1 and 2 the cornea and sclera of the eye are generally indicated at 20—21, respectively, with the limbus portion at the juncture thereof being denoted 22. The lens of the eye is shown at 23 over which the iris 24 functons by its opening to define the pupil 25. Numerals 26 and 27 have been applied to the upper and lower eyelids, respectively.

The contact lens embodying the present invention has a concavo-convex body 28 of any suitable transparent or semi-transparent material. For example, the material may be optical glass or a synthetic resin plastic of the types now generally employed in the contact lens art. Usually the material will be perfectly transparent, but in some instances it may be slightly darkened or tinted for glare reducing purposes or to enhance or modify the natural color of the iris to the end of obtaining desired cosmetic effects.

The lens body 28 will perforce vary in size and shape to conform to the particular eye to which it is fitted. In any case it will be larger than the pupil size corresponding to the maximum opening of the iris. Except for provisions which may be made for my stop means, the lens body will normally be of a size within the limbus of the eye. As in the contact lens of Patent No. 2,510,-438, another characteristic of the lens body 28 is that it has a radius of curvature on its concave side slightly greater than the radius of curvature of the cornea to which it is applied or, in other words, the lens is slightly flatter on its concave side than the convexity of the cornea. As a result there is a gradually increasing clearance between the cornea and the lens from the apical portion of the cornea to the margin of the lens. This clearance enables the natural eye fluids to enter between the lens and the cornea. The presence of this fluid results in a capillary action contributing in holding the lens centered over the cornea. To facilitate the passage of the lens body over the protruding limbus when the lens is temporarily displaced, it is preferred to bevel the concave surface adjacent the margin as at 29. This beveling also facilitates the entry of the tears behind the lens. The marginal portion of the convex surface of the lens body may also be beveled as indicated at 30 to facilitate the passing of the conjunctiva of the eyelids thereover. Both bevels 29 and 30 should be relatively small and confined to the portion of the lens radially beyond the maximum opening of the iris so that the user need never look through a beveled portion.

In FIGS. 1–4 I have shown a standard corneal lens of the type aforedescribed provided with one possible form of stop means for engaging the lower eyelid, and namely a crescent-shaped stop flange 31. This flange may be concavo-convex both longitudinally and laterally speaking and joins the lens body proper along an arc thereof. It will be noted that the convex side of the flange 31 faces downwardly so that its longitudinal arch tends to match somewhat the usual longitudinal concavity of the lower eyelid and convexity of the upper eyelid.

The flange may be cast integrally with the lens body or be a cemented adjunct thereto. Furthermore, it can be located at the lower margin as shown or can be spaced above the lower margin, but in either case it should be beyond the area corresponding to the maximum pupil size.

In the embodiment of FIGS. 1–4 the stop flange 31 is shown as being generally radial with respect to the center of curvature of the convex face of the lens body. This is not critical as the flange could be tilted upwardly or downwardly from its illustrated position as long as it projects outwardly far enough to be engageable by the eyelids.

FIGURE 1 illustrates my lens applied to the eye but having drifted upwardly somewhat beyond the upper portion of the limbus 22. As before pointed out, when this occurs with a prior art cornea lens several blinks must be relied upon to lower the lens into centered position and at times this action will not be successful. However, with my contact lens, as shown in FIG. 2, a blinking of the eye will bring the upper eyelid 26 down against the stop flange 31 and force it down to the lower eyelid 27 whereupon it will move up with the cornea 20 when the eye is opened and focused ahead.

It will also be apparent that the stop flange 31 will prevent the lens from rotating to any appreciable extent on the cornea. The lens can always be perfectly centered by blinking the eye. Thus a decentered lens can be used with no danger of the prism thereof rotating out of proper corrective relation to the eye.

This assurance of lens centering makes possible the use of a bifocal segment 32 (FIGS. 9–10) laminated to a lens 28a above the flange 31 as shown or an equivalent area of increased power for near vision can be provided during grinding of the lens body as an integral part thereof. Similarly, as shown in FIGS. 11–12, a lens 28b can also be given an upper bifocal segment 33 of increased power. To use the lower near vision region 32 the eye is closed as in FIG. 2 to seat the stop flange 31 on the lower eyelid and then opened with the pupil directed in the desired downwardly sloped line of sight as for reading. For far sight the eye ball is rotated upwardly to raise the pupil above the near sight portion 32. Further rotation will of course, in the case of the lens of FIG. 11, move the pupil beneath the second near sight area 33, such being particularly helpful in certain occupations such as carpentry, painting, etc.

In the examples shown in FIGS. 9 and 11 the near sight areas intersect the far sight area by arcuate lines of demarcation. These could as well be straight lines, that is to say, the near sight areas could be true segments as illustrated by the near sight segment 34 of the lens 28c in FIG. 13. This segment can be formed by lamination or grinding as before mentioned, or by butt joining two cemented segments ground to different powers as shown in FIG. 14.

I have pointed out above that the primary purpose of the stop means is for engagement by the eyelids to the ends that the lens cannot travel upwardly completely behind the upper eyelid or below the lower eyelid, has limited rotation, and can always be properly repositioned by blinking. It is not necessary that the stop means take the form of the crescent shaped flange 31. For instance, in FIGS. 7–8 the stop means on a lens 28d consists of knobs or protuberances 35 circumferentially spaced apart, three being shown for example only. Where rotation is not significant a single knob would of course be sufficient. In the case of prismatic contact lenses it may be desirable to position one or more such knobs off center to balance the lens, and thereby shift the center of gravity to the true geometric center of the lens. The knobs 35 can be spaced somewhat above the bottom margin of the lens as shown or can be right at the periphery.

In most human eyes the cornea is spaced above the lower eyelid when the line of vision is straight ahead. In this instance, therefore, the stop means so far described would be spaced above the lower eyelid when the lens is a true corneal lens as defined in Patent No. 2,510,438, since such a lens has an area less than that surrounded by the limbus portion of the eye. However, I recognize that by the concepts of the present invention, the lower portion of the contact lens need not, and in fact, often preferably will not stay within the lower confines of the limbus. The modified lens 28e of FIGS. 5–6 has been shown to illustrate this point. In this case the lens body has been prolonged downwardly by an extension portion 36 which terminates by an outwardly offset foot or stop flange portion 37. These may be cemented marginal adjuncts as shown or formed integrally with the primary part of the lens. The portion 37 can be straight or arched as in the instance of the stop flange 31. Furthermore, the extension portion 36 can be concavo-convex in the general contour of the sclera, but in any case is preferably outwardly beyond the curvature of the concave face of the lens proper sufficiently to easily clear the limbus ridge and not interfere with normal tearing. Preferably the length of the extension portion 36 should be sufficient to bring the foot 37 down into the level of the lower eyelid when the eye is directed straight ahead. In this manner the contact lens will be supported substantially all of the time by the lower eyelid as well as positioned by capillary action of the eye fluids and the contour of the lens. If the lens should shift upwardly somewhat it of course can be readily lowered as before by blinking the eye.

In FIGS. 5–6 I have also shown a trifocal arrangement with an outer near vision segment 38 and an arcuate band 39 serving as an intermediate vision area. These near and intermediate vision portions may be provided by laminating or by grinding a single blank. It may be desirable in some instances to grind the extension portion to act as the near vision area. In any regard the stop foot 37 combined with normal blinking will maintain the trifocal vision areas in proper vertical alinement.

Excluding the various stop means described hereinbefore, my contact lenses will usually have a diameter in the approximate range of 9 to 12 millimeters. If the radius of curvature of the cornea measures 7.9 millimeters the radius of curvature of the concave face of the lens need be only 8.0 or possibly 8.1 millimeters.

I have pointed out that the stop means can be spaced somewhat above the lower margin of the lens body as for example as shown in the case of the protuberances 35 in FIGS. 7–8. In such an instance the lens portion below the stop means will pass behind the lower eyelid when the stop means is brought into engagement therewith as when the eye is blinked. Similarly, it is to be understood that in some cases it will be desirable to extend the lens body 28e or portion 36 in the embodiment of FIGS. 5–6 below the foot 37 so that the extension will pass behind the lower eyelid while the foot is seated thereon. Such passage behind the lower eyelid can aid in keeping the lens positioned.

Also worthy of note is the fact that the stop means, particularly in the case of the flange 31 and foot 37, can be readily gripped by a tweezers to hold the lens while it is being inserted over the cornea. For such a use the jaw faces of the tweezers should be coated as by rubber to insure against accidental marring of the lens thereby.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A corneal contact lens comprising a concavo-convex lens formed of light transmitting material having a marginal size smaller than the limbus portion of the eye and larger than the maximum iris opening thereof, said lens having an elongated downwardly facing stop flange with rounded ends and rounded outer edges projecting substantially normal to the convex side of the lens along the lower edge thereof, said stop flange being downwardly arched to conform to the upper surface of the lower eyelid and projecting forwardly approximately the width of said upper surface to thereby prevent rotation of the lens by engagement of the stop flange with the lower eyelid when urged thereagainst by the upper eyelid.

2. The corneal lens of claim 1 in which said stop flange is crescent shaped.

3. A bi-focal corneal contact lens comprising a concavo-convex lens formed of light transmitting material having a marginal size smaller than the limbus portion of the eye and larger than the maximum iris opening thereof, said lens having a bottom forwardly projecting stop flange presenting an elongated downwardly facing stop face with rounded ends and rounded outer edges extending substantially normal to the convex side of the lens along the lower edge thereof, said stop face being downwardly arched to conform to the upper surface of the lower eyelid and extending forwardly approximately the width of said upper surface to thereby prevent rotation of the lens by engagement of the stop flange with the lower eyelid when urged thereagainst by the upper eyelid, the portion of said lens immediately above said stop face being thicker than the remainder of said lens and having its front surface formed to provide a bottom near-sight vision area of greater power than said remainder.

References Cited in the file of this patent

UNITED STATES PATENTS

| | | |
|---|---|---|
| 2,247,628 | Beitel | July 1, 1941 |

FOREIGN PATENTS

| | | |
|---|---|---|
| 431,950 | Germany | July 27, 1926 |
| 865,935 | Germany | Feb. 5, 1953 |

OTHER REFERENCES

Nierenberg, "Some Applications of Contact Lens Prostheses," article in the Optical Journal and Review of Optometry, vol. XCI, No. 20, Oct. 15, 1954, pages 37, 40 and 41 cited.

Abrams, "A New Contact Lens Design," article in the Optical Journal and Review of Optometry, vol. XCIV, No. 20, Oct. 15, 1957, pages 32 and 33 cited.